June 4, 1968  C. GROS  3,386,874

WELDING OF PLASTICS SHEET MATERIAL

Filed March 18, 1964

INVENTOR:
Chajim Gros,
BY:
Smith, Michael & Gardiner,
ATTORNEYS.

United States Patent Office 3,386,874
Patented June 4, 1968

3,386,874
WELDING OF PLASTICS SHEET MATERIAL
Chajim Gros, 39 Alexandra Road,
London NW. 8, England
Filed Mar. 18, 1964, Ser. No. 352,876
Claims priority, application Great Britain, Mar. 20, 1963,
10,968/63
10 Claims. (Cl. 156—220)

This invention relates to the welding of plastics sheet material.

Decorative plastics sheet material can be produced bearing a design imprinted in the sheet material by a welding process. In particular, a laminated sheet comprising an upper relatively thick layer, a lower relatively thin layer and an intermediate layer of plastics sponge material is fed into a welding machine containing a die bearing the embossed decorative pattern to be welded in the laminated sheet. The die is brought down on to the sheet, pressure is applied and simultaneous high frequency heating is applied to cause welding of the sheet material along the lines or other shapes of the pattern, this welding resulting in fusion between the layers of the sheet along these lines or shapes. The sheet material thus welded has a quilted appearance.

The upper layer of plastics sheet material can be coloured, but to pick out the weld lines in another colour gives rise to considerable difficulty. It has been proposed to colour the weld lines by interposing a sheet bearing gold, bronze or other metal coating between the plastics sheet and the die with the coating next to the plastics sheet and applying the die a second time without heat, or inserting the coated sheet and printing from it simultaneously with the welding operation. However, either of these operations give rise to considerable difficulty.

It is an object of this invention to provide an improved method of imparting a colour to the weld lines on a plastics sheet different from the colour of the sheet itself.

According to the invention, colour is applied to the plastics sheet material in the same operation as welding the sheet material, by applying a coating of the colourant to the die by any suitable technique, so that when the die is pressed on the sheet material, the colour is applied to the sheet material and defines the lines or other shapes of the pattern and heat is applied to weld the pattern in the sheet. The heat can be applied simultaneously with the application of the colour, or if necessary there can be a short delay before applying the heat. Such colourant can be metal, e.g. gold or bronze in the form of a paint, or can be a non-metallic paint or ink, and is conveniently applied to the die by means of a roller, a brush or by spraying.

In order that the invention can be fully understood some embodiments thereof will now be described, by way of example, with reference to the accompanying drawing, in which.

Figure 1:
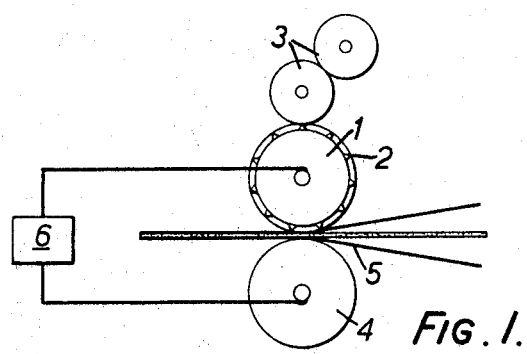
FIGURE 1 illustrates one form of apparatus for carrying out the method according to this invention.

Referring now to FIGURE 1 there is shown a roller die 1 which has a pattern 2 extending around, and upstanding from, its surface. The roller 1 is disposed between and in engagement with "inking" rollers 3, on which a liquid colourant has been deposited, and a support roller 4. The liquid colourant is transferred to the upstanding pattern on the roller die and this coloured pattern is welded on a multi-layer sheet 5 of plastics material fed between the rollers 1 and 4 to produce a quilted effect on the sheet. A high frequency generator 6 is connected across the rollers 1 and 4 in order to generate heat in the plastics sheet and effect the welding.

Figure 2:
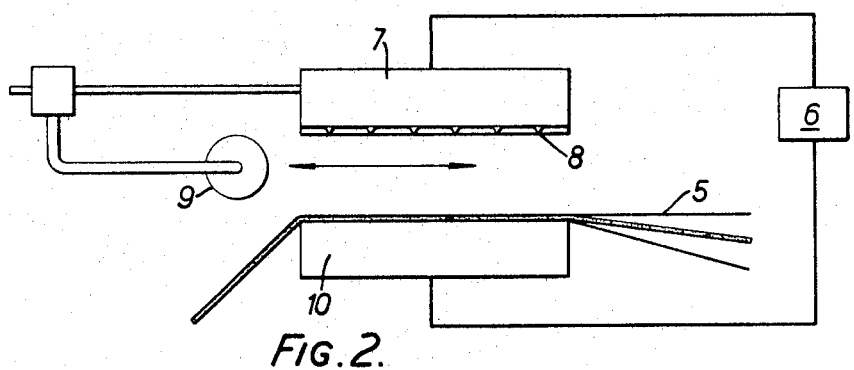
FIGURE 2 illustrates another form of apparatus for carrying out the method.
Figure 3:
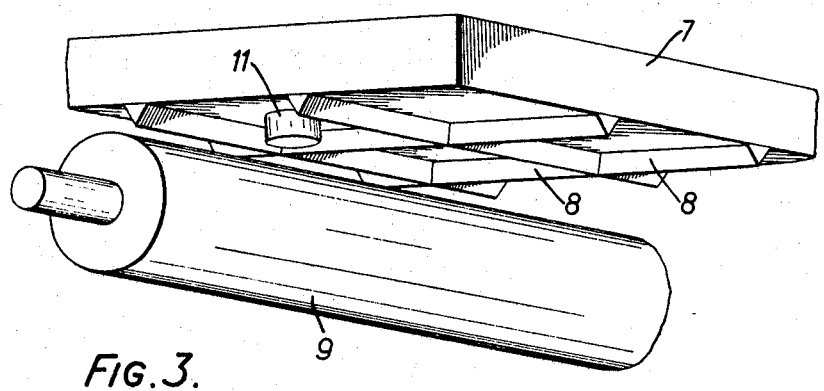
FIGURE 3 illustrates a perspective view of the underside of a die plate employed in the embodiment of FIGURE 2.

Referring now to FIGURES 2 and 3, there is shown a die plate 7 which has a multiplicity of crossed rectilinear bars 8 upstanding from its lower surface which together define a pattern of diamonds. A roller 9 is reciprocally movable across the pattern in contact therewith to coat the bars with a liquid colourant. Subsequently, the die plate is pressed downwardly on to the multi-layer sheet 5 of plastics material on a bed 10 of the die press, the welding being effected by the passage of high frequency current through the sheet from the generator 6 as in the FIGURE 1 embodiment.

In a continuous process the plastics sheet is passed over the bed of the die press in a stepwise movement in synchronism with the reciprocatory movement of the die plate.

Colour can also be applied to non-welded parts of the sheet, by fitting in the squared pattern of the die a non-conductive die part, for example of rubber. One such part (11) is shown by way of example in FIGURE 3. If this non-conductive die part is of rubber or other resilient material it will be raised above the adjacent conductive parts of the die.

According to a further feature of the invention, the application of two or more colours can be effected as follows. The pattern to be applied is divided according to the number of colours to be used, and the parts of the design for each colour are formed on separate dies or on separate parts of the same die. Each die or die part is then coated with its respective colourant, and is brought down on to the sheet material, pressed to apply the colour and heat is applied to weld the design. In this process the sheet material is moved to locate it accurately under the respective die or die part. Alternatively however, in the case of separate dies, the sheet material could be held stationary and each of the dies in turn could be moved into position over the part of the sheet to be welded and coloured, and the dies applied in succession.

The invention has been described in relation to the welding of a multi-layer sheet, for example, the laminated sheet described above, but it is to be understood that the invention is equally applicable to the welding of single sheets of compressible plastics material.

I claim:
1. A method of producing a quilted plastics sheet in which colouring matter is applied to at least part of the quilted pattern, which comprises the steps of
   forming a die having the pattern embossed thereon,
   applying wet colouring matter directly to the embossed pattern only on the die,
   placing a first sheet of solid plastics material on top of a second sheet of foamed plastics material,
   pressing the die on said first sheet to transfer the wet colouring matter thereto and
   heating the plastics material in the regions in which it is contacted by the embossed pattern of the die by means of high frequency to effect welding of the two sheets.

2. A method according to claim 1, in which said die is in the form of a flat plate having the pattern upstanding from one side thereof.

3. A method according to claim 1, in which said die is in the form of a roller having the pattern upstanding from its peripheral surface.

4. A method of imparting an embossed coloured pattern to a sheet of compressible plastics material by,
   applying a wet colourant to an upstanding pattern only on a die,
   pressing together said sheet of plastics material and said die to transfer the wet colourant to the sheet, and heating throughout its thickness those portions of the sheet beneath areas in contact with the die to impart said pattern to the sheet.

5. A method according to claim 4, wherein said sheet is a multi-layer sheet comprising
a sheet of foamed plastics material and
a backing sheet of plastics material for the foamed sheet, and wherein said foamed sheet is welded to the backing sheet by said heating.

6. A method according to claim 5, wherein the sheets are heated by passing a high frequency current through said portions of the sheet in contact with the die.

7. A method of producing a multi-coloured quilted plastics sheet by welding in a press having a bed plate and a die having a pattern of the quilting upstanding therefrom, the method comprising
applying wet colouring matter to the upstanding pattern only on the die,
placing a sheet of compressible plastics material on the bed plate,
pressing together the die and bed plate with the plastics sheet therebetween to transfer the wet colouring matter from the die to the sheet, and
heating the sheet to fuse those parts of the sheet lying between the bed plate and the upstanding pattern of the die permanently to impart said pattern to the sheet.

8. A method according to claim 7, in which said sheet is heated by the passage of high frequency current therethrough.

9. A method according to claim 8, in which said sheet is a composite sheet comprising
first and second outer sheets of plastics material, and
a sheet of foamed plastics material interposed between the first and second sheets, the sheets being welded together through by the heating effect of the high frequency current.

10. A method according to claim 9, in which colouring matter is applied to upstanding non-conducting portions of said die within said closed pattern, which colouring matter is transferred to the sheet of plastics material upon the pressing together of the die and bed plate.

References Cited

UNITED STATES PATENTS

| | | | |
|---|---|---|---|
| 2,404,073 | 7/1946 | Karfoil et al. | 156—209 |
| 3,098,438 | 7/1963 | Freund | 156—232 |
| 75,957 | 3/1868 | Murr | 101—32 |
| 2,621,139 | 12/1952 | Messing | 156—290 |
| 3,001,572 | 9/1961 | Young | 156—386 |
| 3,244,571 | 4/1966 | Weisman | 156—290 |

DOUGLAS J. DRUMMOND, *Primary Examiner.*